United States Patent [19]
Baker

[11] Patent Number: 5,415,681
[45] Date of Patent: May 16, 1995

[54] PROCESS FOR REMOVING INORGANIC COMPONENTS FROM WATER

[75] Inventor: Richard W. Baker, Palo Alto, Calif.

[73] Assignee: Membrane Technology and Research, Inc., Menlo Park, Calif.

[21] Appl. No.: 124,801

[22] Filed: Sep. 20, 1993

Related U.S. Application Data

[63] Continuation-in-part of Ser. No. 890,931, May 29, 1992, Pat. No. 5,273,572.

[51] Int. Cl.⁶ .................... B01D 53/22; B01D 19/00
[52] U.S. Cl. ........................................... 95/45; 95/48; 95/49; 95/51; 95/54; 95/246; 95/258; 95/263; 96/4; 96/193; 96/202
[58] Field of Search .................. 95/45, 47–49, 95/51, 54, 245, 246, 258, 263–266; 96/4, 7–9, 193, 202

[56] References Cited

U.S. PATENT DOCUMENTS

| | | | |
|---|---|---|---|
| 2,845,137 | 7/1958 | Sebald | 95/264 X |
| 3,815,330 | 6/1974 | Lawley | 96/202 X |
| 4,358,296 | 11/1982 | Notardonato et al. | 95/245 |
| 4,412,924 | 11/1983 | Feather | 95/245 X |
| 4,444,571 | 4/1984 | Matson | 55/16 |
| 4,517,094 | 5/1985 | Beall | 210/664 |
| 4,752,306 | 6/1988 | Henriksen | 95/258 X |
| 4,857,198 | 8/1989 | Meidl | 210/603 |
| 4,881,953 | 11/1989 | Prasad et al. | 95/54 X |
| 4,892,664 | 1/1990 | Miller | 210/747 |
| 4,963,165 | 10/1990 | Blume et al. | 95/49 X |
| 4,997,571 | 3/1991 | Roensch et al. | 95/263 X |
| 5,082,471 | 1/1992 | Athayde et al. | 95/51 |
| 5,122,165 | 6/1992 | Wang et al. | 95/245 X |
| 5,273,572 | 12/1993 | Baker et al. | 95/48 |

Primary Examiner—Robert Spitzer
Attorney, Agent, or Firm—J. Farrant

[57] ABSTRACT

A process for removing inorganic components from water is disclosed. The process involves gas stripping followed by membrane separation treatment of the stripping gas. The stripping step can be carried out using one or multiple gas strippers and using air or any other gas as stripping gas. The membrane separation step can be carried out using a single-stage membrane unit or a multistage unit. Apparatus for carrying out the process is also disclosed. The process is particularly suited for treatment of contaminated groundwater or industrial wastewater.

55 Claims, 10 Drawing Sheets

PROCESS FOR REMOVING INORGANIC COMPONENTS FROM WATER

This application is a continuation-in-part of U.S. patent application Ser. No. 890,931, "Process for Removing an Organic Compound from Water," filed May 29, 1992, now U.S. Pat. No. 5,273,572. The content of the parent application is incorporated herein by reference in its entirety.

FIELD OF THE INVENTION

This invention relates to a process for removing inorganic components from water. More particularly, the invention relates to a gas-stripping process, adapted so that the exhaust gas from the stripper can be treated by a membrane separation process to remove inorganic gases such as hydrogen sulfide, bromine, hydrogen cyanide, sulfur dioxide, oxygen, carbon dioxide, ammonia and hydrazine.

BACKGROUND OF THE INVENTION

Stripping is a process used to remove volatile components from water. The basic concept is to bring the contaminated water into intimate contact with a stripping gas, frequently air, so that the volatile components undergo a phase change from liquid to vapor and are carried away by the stripping gas. A number of interrelated design factors affect the stripping efficiency: the Henry's law coefficient of the volatile component, the stripping gas:water volume flow ratio, the contact time and the mass transfer rate. The gas:water volume ratio used to remove the component from water depends on the volatility of the component to be removed, its concentration in the feed water and the physical attributes under which the contact is carried out. It is typically in the range 50:1–500:1 or more. The contaminant gas is, therefore, diluted by this amount when it is transferred from the water to the gas. When other factors are constant, a high gas:water volume ratio provides a high percentage of gas removal from the water, but creates large volumes of stripping gas with dilute concentrations of the stripped gas. A low gas:water volume ratio may provide insufficient dilution of the stripped gas to maintain a good driving force for mass transfer. Under optimum conditions, transfer of the component from the water to the stripping gas can be very efficient and removal rates up to 99.99% can be achieved.

The principal disadvantage of gas stripping is the air pollution that is caused when the waste gas is discharged. Various treatments have been proposed for this exhaust stripping gas. U.S. Pat. No. 4,892,664 describes an air-stripping system followed by catalytic oxidation of the contaminated air. U.S. Pat. No. 4,857,198 describes air-stripping in combination with a mixed carbon adsorption/biological treatment for the waste air. U.S. Pat. No. 4,517,094 also briefly mentions combinations of air stripping and carbon adsorption. Stripping can be used to remove or recover both volatile organic compounds and dissolved inorganic gases. Following are examples of stripping operations with inorganic gases.

Stripping Hydrogen Sulfide

Stripping can be used in the recovery of hydrogen sulfide. Hydrogen sulfide, which is slightly soluble in water, may be found in groundwater in dilute concentrations (approximately 1 ppm). Stripping hydrogen sulfide from groundwater allows it to be used as drinking water. The hydrogen sulfide concentrated stream is discharged to a catalytic process for further treatment.

Refinery and coking operations, however, often produce streams with higher concentrations of hydrogen sulfide (100 ppm). Such streams are also stripped, but the concentrated hydrogen sulfide discharge stream is sent to an incinerator.

Stripping Bromine

Stripping is also commonly employed in a bromine recovery process, which has gained significant importance due to economics and environmental pressures. The recovery process either involves deriving bromine from its natural state of occurrence or recovering bromine from bromine waste. Bromine occurs as bromide in seawater (0.188% Br), in the mother liquor from salt wells of Michigan, Ohio, West Virginia, and Arkansas, and in the potassium deposits of France and Germany. In the U.S. nearly all bromine is derived from the natural brines. Bromine containing waste is generated by bromination reaction of organic compounds in the production of numerous specialty chemicals, including pharmaceuticals, flame retardants, and agrochemicals. Bromination reactions generally produce the desired bromine containing end product and large quantities of bromine containing byproduct such as hydrogen bromide and sodium bromide. This large volume of waste must either enter the waste stream or be recovered for other uses.

The process begins with the oxidation of the bromine-containing solution by chlorine or oxygen. The oxidized solution is subjected to a steaming-out process, where it is steam stripped to sweep out the bromine vapors. The steam-containing bromine vapors are condensed and collected in a decanter, where bromine is recovered by phase separation. Bromine recovery from streams with lower concentration, i.e. where the bromine concentration is less than 200 ppm, is effected by air stripping instead of steam stripping after oxidation.

Stripping Hydrogen Cyanide

Stripping is also used to separate hydrogen cyanide from water. Cyanide and its various salts, including sodium cyanide, are frequently used in metal electroplating operations. The rinse water produced by such operations is contaminated with cyanide and its salts, which are in unstrippable form. Acidifying the contaminated water, however, produces hydrogen cyanide which is strippable. After stripping, the water stream is recycled and the stripped hydrogen cyanide may be incinerated or recycled.

Stripping Sulfur Dioxide

Stripping is also used in sulfur dioxide recovery process. Sulfur dioxide contaminated streams are commonly produced in sulfuric acid manufacturing operations as blowdown water. These streams are stripped and the stripped sulfur dioxide is recycled.

Stripping Carbon Dioxide, Ammonia, Hydrazine, or Oxygen

Stripping is also used to separate carbon dioxide, ammonia, hydrazine, or oxygen from water. Numerous industrial processes produce water streams containing carbon dioxide, which may be present either as a contaminant or as a desired compound to be recycled. Ammonia is produced in fertilizer production, coal gasification and refinery operations. In fertilizer production, the recovered ammonia is the desired end product. In coal gasification and refinery operations, ammonia is a contaminant and the recovered ammonia is sent to an incinerator. In boiler operations, hydrazine is used as an antioxidant and may be recovered by stripping if necessary. Excess oxygen, produced in boiler operations, is stripped from water using nitrogen as a preventive measure against corrosion.

That membranes have the capability to separate inorganic vapors and gases from other gases is known. For example, U.S. Pat. No. 4,608,060 describes the separation of hydrogen sulfide, sulfur dioxide and ammonia from such gases as methane, nitrogen, hydrogen and carbon dioxide using a composite membrane of polyethylene glycol and silicon rubber mixture on polysulfone. U.S. Pat. No. 4,963,165 describes the separation of carbon-dioxide from such gases as methane and nitrogen using composite membranes of polyamide-polyether block copolymer on a microporous support material.

Membranes have been used with stripping columns before to recover and reuse a significant fraction Of sensible and latent heat present in the gas/vapor overhead mixture from a stripping column. U.S. Pat. No. 4,444,571 describes the use of a semipermeable membrane, which is more permeable to steam, the stripping agent, than the contaminant gas. The permeate, primarily consisting of the stripping agent, is fed back directly into the stripper for reuse, which avoids the condensation of the overhead mixture performed in conventional stripping operations. The permeate, however, still contains a significant concentration of the contaminant gas. Reuse of this permeate in stripping operations greatly reduces the driving force of mass transfer of the component from the water to the gas. Hence, the stripper efficiency decreases noticeably.

SUMMARY OF THE INVENTION

The invention is an improved gas-stripping process, involving a combination of a gas-tripping operation followed by a membrane separation operation to treat the exhaust gas from the stripper. It has been found possible to combine gas stripping and membrane separation so as to maintain adequate water treatment and simultaneously reduce or eliminate discharge of inorganic components. The process is designed to remove inorganic components, such as dissolved gases, from water.

The process of the invention has several aspects. In one aspect, the membrane separation step is used to recover the inorganic component for reuse in the process producing the contaminated water and to simultaneously regenerate the stripping gas, which is fed back to the gas inlet of the stripper. It has been found that adequate stripping can be achieved, even though the recirculated gas contains small amounts of the inorganic component. If desired, the combined system can operate in an essentially closed loop, so that no waste gas is vented to the atmosphere, thereby eliminating air pollution. Because the stripping gas is reused, it is economically practical to use nitrogen, methane or another gas of choice in the stripping step. Where corrosion can be a problem, nitrogen is preferred over air.

In another aspect, the invention matches the operating constraints of the gas-stripping unit and the membrane unit. The stripping operation is carried out with a lower than normal gas:water volume ratio. This decreases the performance of the stripping unit, but produces a smaller-volume, higher-concentration exhaust gas, amenable to efficient treatment by membrane separation. Such a design may be appropriate where a trade-off between slightly lower water quality and reduced air pollution is indicated.

In another aspect, the invention simultaneously achieves high degrees of water purification and high degrees of inorganic component removal from the stripper exhaust gas. In these embodiments, the stripping operation is split into two parts. The first stripping operation is designed to produce an exhaust gas that can be treated efficiently by membrane separation. The second stripping operation is designed to achieve a high degree of removal of the remaining inorganic component from the water. A different type of separation technique can be substituted for the second stripping operation.

In another aspect, the invention involves purification or separation of a stream that is generated in non-strippable form. Bromine and cyanide, for example, may be present in water as salts, such as sodium bromide and sodium cyanide respectively, which are not strippable, i.e. they are nonvolatile and are not capable of being swept by the stripping gas. In such cases, the salts are either acidified or chlorinated, to produce a dissolved gaseous compound, which can be stripped. Acidification and chlorination is carried out in a treatment step before gas-stripping. The treatment step can be carried out in an independent reactor unit. Where the acidification and chlorination reactions are instantaneous, however, the treatment step can be carried out in the stripper itself. In such cases, the nonvolatile component and the acid or chlorine are introduced in the stripper together or simultaneously.

In another aspect, the invention involves operating the gas-stripping step under reduced pressure. This reduces the volume and increases the concentration of the exhaust gas fed to the membrane separation step.

The gas stripper can be of any type that enables the laden stripping gas to be confined and passed to the membrane unit for treatment. A packed tower type of stripper is preferred especially for large volume stream of 50 gpm or more; a low profile tray stripper is preferred for small streams.

The membrane separation process may be configured in many possible ways, and may include a single membrane stage or an array of two or more units that permit multiple treatments of the permeate and/or residue streams from the first unit.

The driving force for permeation across the membrane is the pressure difference between the feed and permeate sides. The pressure drop may be achieved by drawing a vacuum on the permeate side of the membrane, by pressurizing the feed, or both.

The invention is particularly useful for treating groundwater or industrial waste water contaminated with or containing inorganic components. The invention is applicable to any volatile gas that has some solubility in water, particularly hydrogen sulfide, bromine, hydrogen cyanide, sulfur dioxide, oxygen, carbon dioxide, ammonia and hydrafine.

It is an object of the invention to provide a gas-stripping process in which emissions of undesirable inorganic components to the atmosphere are eliminated or minimized.

It is an object of the invention to provide an improved method of treating water containing inorganic components and gases.

It is an object of the invention to provide an improved method of treating water containing unstrippable inorganic compounds.

Other objects and advantages of the invention will be apparent from the description of the invention to those of ordinary skill in the art.

DETAILED DESCRIPTION OF THE INVENTION

The invention concerns processes and apparatus involving a combination of a gas-stripping operation followed by a membrane separation operation to treat the exhaust gas from the stripper. Gas stripping is usually used to treat water streams containing low concentrations of gas, below 100 ppmw and often as low as a few ppmw or in the ppbw range. The invention is useful in the treatment of such streams. It has been found, however, that water containing relatively high concentrations of inorganic gases, certainly above 100 ppmw and up to 500 ppmw or much higher can be treated by following the teachings of the invention.

Figure 9:
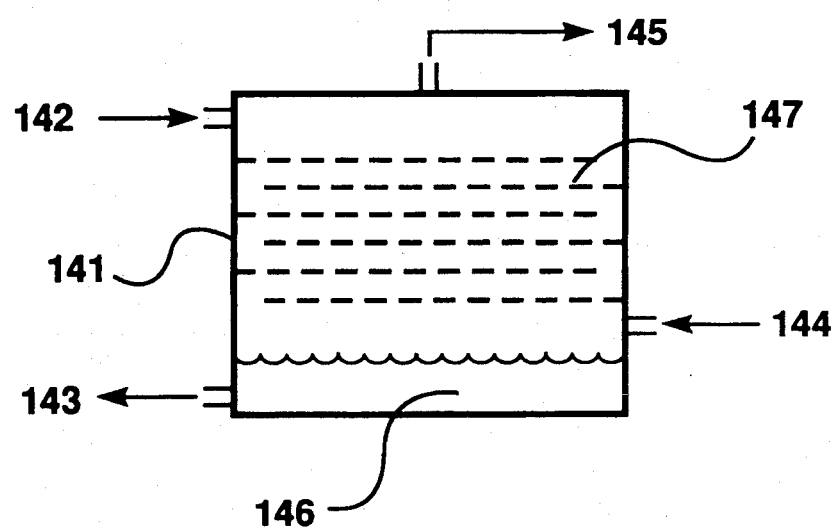
FIG. 9 is a schematic showing a low-profile tray tower.
Figure 10:
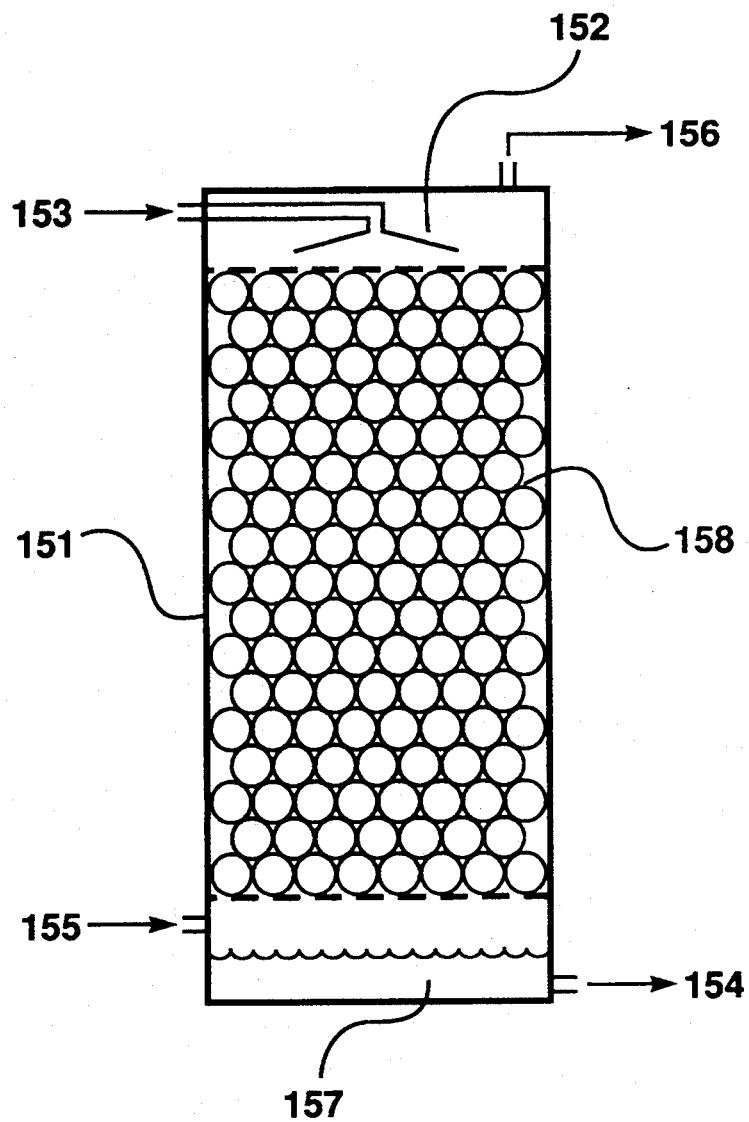
FIG. 10 is a schematic showing a packed-bed tower.

The gas stripper can be of any type, and of any flow configuration, that enables the laden stripping gas to be confined and passed to the membrane unit for treatment. Tower strippers, including spray towers, tray towers and packed towers, are preferred for large volume streams. A spray tower, relatively simple in its design, breaks up the water stream into fine droplets by pumping it through nozzles. Air is passed up through the tower, normally countercurrent to the descending spray. In tray towers, air is bubbled through the water in a series of aeration trays. The advantages of tray towers are: (1) a tray tower can be substantially shorter than a spray or packed tower, which is convenient for indoor use and in chemical plants, and (2) the tray tower is modular, which means that trays are easily added or removed. Tray strippers are usually referred to as low-profile strippers or low-profile tray towers due to their reduced height. A low-profile tray tower, as shown in FIG. 9, is preferred for smaller volume streams in the range 1–50 gpm. In a low profile tray tower 141, water flows in from inlet 142 at the top of the tower, trickles down the tower to sump 146 and flows out of outlet 143 at the bottom of the tower. The air, on the other hand, enters from the inlet 144 at the bottom of the tower and exits from the outlet 145 at the top of the tower. Inside the tray tower, air is bubbled through water in a series of perforated trays 147. In tray towers, the transfer coefficient is a function of both the water flow rate and the stripping gas flow rate. In a packed tower, the basic design is a reinforced fiberglass tower filled with a packing medium, which is used to maximize the gas/water contact surfaces. Packed towers are the most preferred tower type. The most preferred operating configuration is countercurrent, in which water passes from top to bottom of the tower and gas passes from bottom to top, as shown in FIG. 10. Water flows in from inlet 153 at the top of the tower 151 through the liquid distributor 152. The liquid distributor spreads the water over the packing material 158 before it trickles down the tower to sump 157, and then flows out of outlet 154. Air enters from inlet 155 at the bottom of the tower and exits from outlet 156 at the top of the tower. Other configurations, for example, crossflow, in which water passes from top to bottom and air flows in at the sides, to the center and then out at the top, may also be used.

The stripping gas may be delivered by a forced draft blower or pump on the inlet side or by an induced draft system on the outlet side.

The membrane unit contains a membrane that exhibits a substantially different permeability for the inorganic component to be stripped than for the stripping gas. It may be relatively permeable to the inorganic component to be stripped but relatively impermeable to the stripping gas or relatively permeable to the stripping gas but relatively impermeable to the inorganic component to be stripped. The membrane may take the form of a homogeneous membrane, an asymmetric membrane, a composite membrane, a membrane incorporating a gel or liquid layer or particulates, or any other form known in the art.

Membranes made from rubbery or glassy materials may be used, depending on the specific separation to be performed. Whatever their composition and structure, the membranes should preferably have a selectivity for the faster permeating component over the other component of at least 5, more preferably at least 10 and most preferably at least 20.

The form in which the membranes are used in the invention is not critical. They may be used, for example, as flat sheets or discs, coated hollow fibers, or spiral-wound modules, all forms that are known in the art.

The flux of a gas or vapor through a polymer membrane is proportional to the pressure difference of that gas or vapor across the membrane. To achieve high fluxes of the permeating components, it is desirable not only to make the perspective membrane thin, but also to operate the system with a substantial pressure drop across the membrane. This pressure drop can be achieved by drawing a vacuum on the permeate side of the membrane, by pressurizing the feed, or both.

In designing processes and apparatus that combine gas stripping with membrane separation, the operating constraints of the gas stripper and the membrane unit must be considered. In gas stripping, the ratio of volume flow of gas to volume flow of water is important. If other factors are constant, to obtain a high level of inorganic component removal from the feed water this ratio should be such that the concentration of the inorganic component or gas in the liquid, in equilibrium with the concentration of inorganic component gas or liquid in the gas phase, approaches zero. This frequently means that the gas:water volume ratio is high, such as 50:1, 100:1 or higher, and the concentration of the inorganic component in the gas phase is very low. Thus, a gas stripper normally achieves high performance by using large volumes of stripping gas and creating a high-volume, low-concentration exhaust.

Turning now to the membrane system, a number of factors affect the design and performance of the membrane unit. An important design consideration is the membrane feed gas flow rate. Upon this flow rate depend the membrane area required and the flow capacities of ancillary equipment, such as filters, pumps, condensers, etc. Thus, a lower feed gas flow rate enables a smaller membrane area and smaller pumps to be used. The capital and operating costs of the membrane unit are correspondingly reduced.

Important parameters that affect the performance of the membrane system include the selectivity, the feed:-permeate pressure ratio, the stage cut (total permeate flow/total feed flow) and the feed concentration. A single-stage membrane separation unit is typically able to remove 80–90% of the inorganic component from the feed gas to produce an enriched permeate stream that has at least 5–10 times the concentration of the feed gas. The enriched stream can be handled in a number of ways. Ideally it can be recycled to the process generating the component-laden water; alternatively the gas could be sent to a destruction process such as catalytic incineration or bioconversion. The gas could also be treated by cooling and condensing. Finally, in some cases, the gas could simply be vented or flared. If other factors are constant, the more dilute the feed stream, the more dilute is the enriched stream and the more difficult it becomes to recover or dispose of the inorganic component in question in a cost-effective and environmentally acceptable manner. Thus, membrane separation is favored for feed streams that are characterized by low volume and high concentration compared with gas-stripper exhaust streams.

These operating constraints appear to render combinations of gas stripping and membrane separation unattractive, since the gas stripper and the membrane separation unit work best under conditions that are mutually contradictory: high volume, low-concentration for the stripping gas and low-volume, high concentration for the membrane feed gas. Nevertheless, we have found that it is possible to combine gas stripping with membrane gas separation in a number of useful ways.

Some representative descriptions of the best mode of carrying out the invention in its various aspects are described below. These embodiments are illustrative of workable configurations, but are not intended to limit the scope of the invention in any way. Those of skill in the art will appreciate that the embodiments described could be modified or combined and that many other embodiments in accordance with the invention are possible.

In all the embodiments described below, it is preferred that the overall treatment operation achieves at least about 60% removal of the inorganic component from the water and most preferably it should achieve at least about 90% removal.

1, Regeneration and reuse of stripping gas

Figure 1:
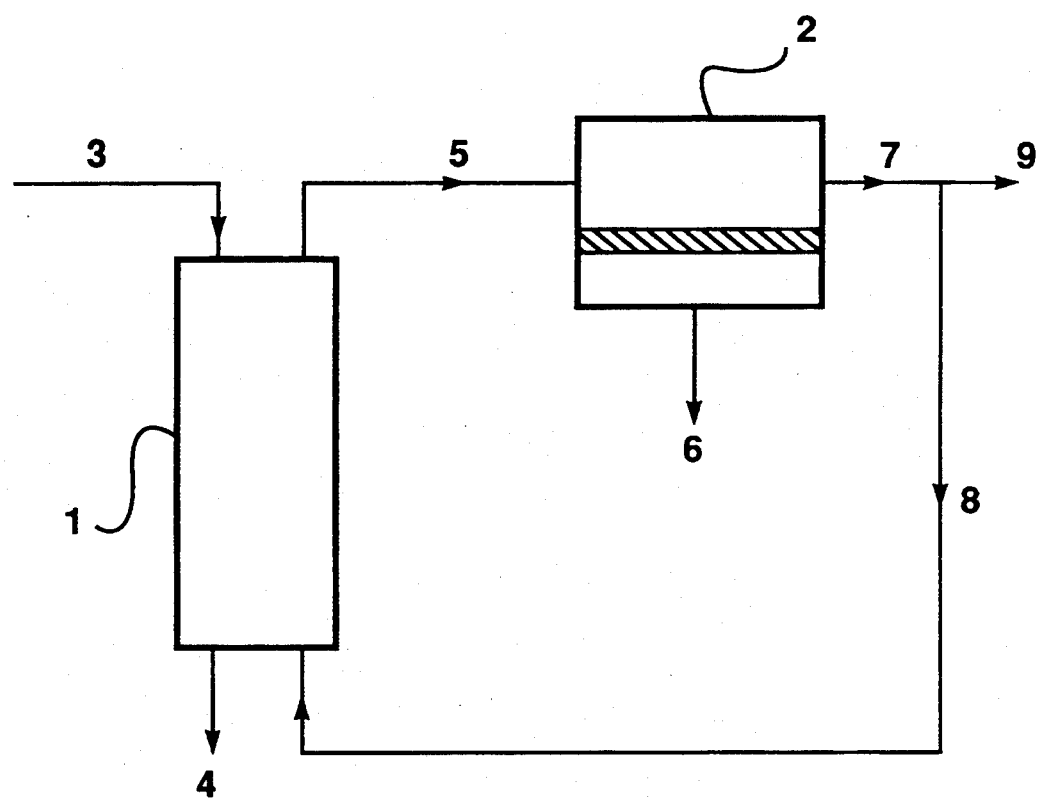
FIG. 1 is a schematic showing an embodiment of the invention in which all or part of the treated gas from the membrane separation unit is returned to the stripper.

An embodiment of the invention in which the stripping gas is regenerated and reused is shown in FIG. 1. Referring now to this figure, gas stripper 1 is used to remove an inorganic component from water stream 3. The stripping gas enters the stripper as stream 8 and exits as stream 5, which is laden with the component. The treated water stream exits the stripper as stream 4. Gas stream 5 passes to membrane separation unit 2. The inorganic component passes preferentially through the membrane and emerges as permeate stream 6. The treated gas stream, depleted of the component, exits the membrane separation unit as stream 7. Stream 7 may be completely returned to the stripper for reuse, or may be partially reused and partially discharged. Stream 8 represents the portion of the treated gas stream that is reused in the stripper; stream 9 is the discharge stream.

The figure is a schematic showing the process concept. The apparatus used to carry out the process will, of course, include other components. For example, a pump or blower would normally be used between the membrane outlet and the stripper inlet to circulate the gas through the stripper. The pump or blower may be placed near the stripper inlet or elsewhere as convenient. Alternatively or additionally, a pump positioned in the gas outlet line from the stripper can be used to draw gas through the stripper. A filter may be installed upstream of the stripper or the membrane unit to remove particulates, oil or other contaminants from the water or gas streams entering the stripper or membrane unit. A compressor may be installed upstream of the membrane unit to raise the pressure of the membrane unit feed gas and thereby provide a transmembrane driving force. Alternatively or additionally, a vacuum pump may be connected to the permeate side of the membrane unit to lower the permeate pressure and thereby provide or enhance the transmembrane driving force. If only a portion of the regenerated gas is reused, fresh stripping gas must be added at each pass through the stripper. This might be the case, for example, if nitrogen is used to provide an inert stripping atmosphere. If oxygen leaks into the system, partial discharge of the treated stream may be used to keep the oxygen content of the stripping gas to a safe level and the stripping gas may be topped up with fresh, high-purity nitrogen. Partial discharge might also be appropriate if there are dischargeable components stripped from the water that are not well removed by the membrane unit.

FIG. 1 shows the membrane separation operation as a single-stage operation. If the permeate from the first stage is too dilute for recovery or further treatment, a multistage membrane system, in which the permeate from one stage becomes the feed to the next, can be used. Because the exhaust gas from the stripper is dilute, two or three membrane stages may be required to achieve sufficient concentration of the permeate.

Figure 5:
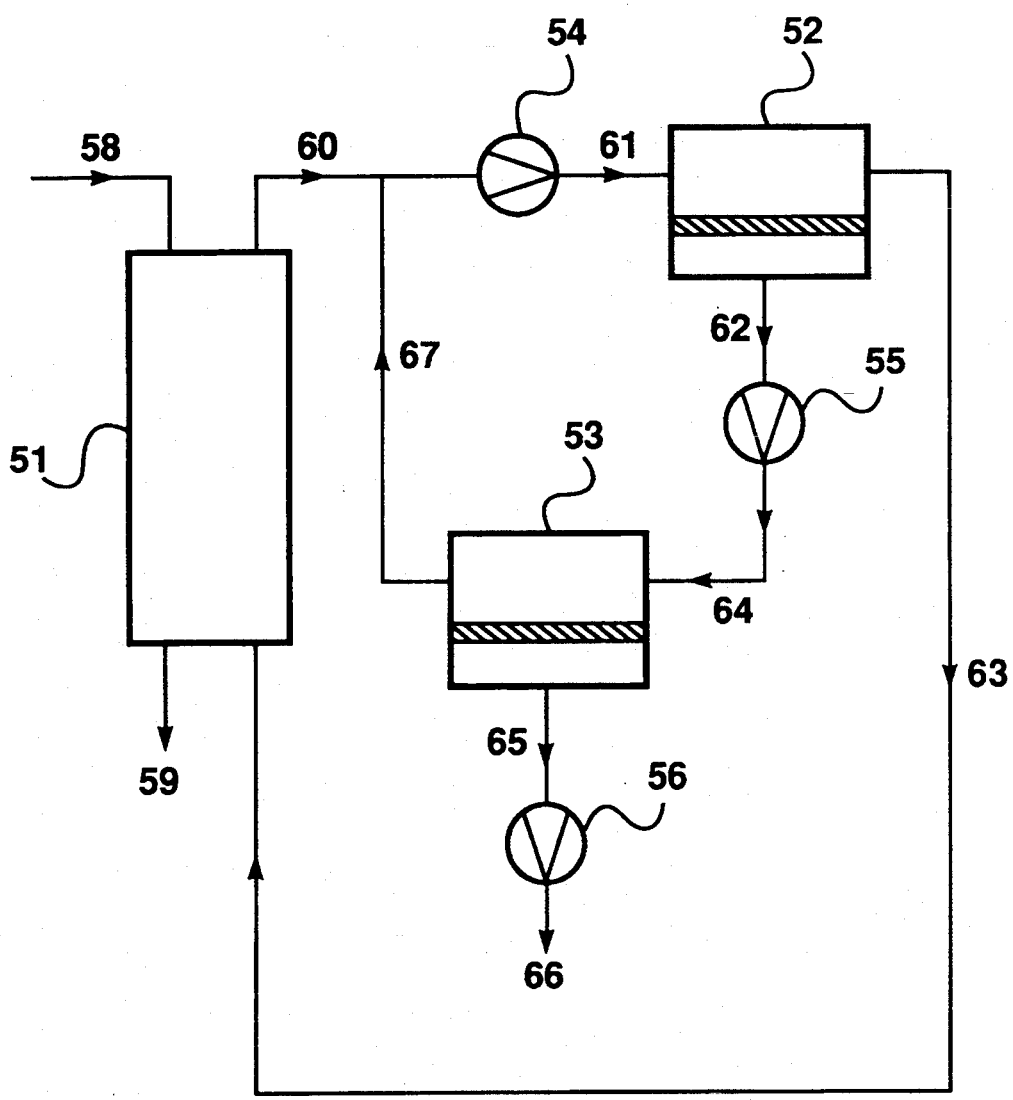
FIG. 5 is a schematic showing an embodiment of the invention using a two-stage membrane separation unit.

An example of a two-stage system is shown in FIG. 5. Referring now to this figure, gas stripper 51 is used to remove an inorganic component from water stream 58. The stripping gas enters the stripper as stream 63 and exits as stream 60, which is laden with the component. The treated water stream exits the stripper as stream 59. Gas stream 60 is compressed by compressor 54 and passes as compressed gas stream 61 to membrane separation unit 52. A vacuum pump 55 in the permeate line increases the driving force for membrane permeation. The treated gas stream 63, depleted of inorganic component, is returned to the gas stripper inlet. The inorganic component passes preferentially through the membrane and emerges as permeate stream 62. Permeate stream 62 is too dilute for efficient inorganic component recovery and is passed by line or stream 64 to a second membrane stage 53 for further treatment. A second vacuum pump 56 in the permeate line provides a driving force for membrane permeation. The second residue stream 67 from this stage is returned on the upstream side of the first membrane stage. Permeate stream 65 is pumped out as inorganic stream 66. If the inorganic component is relatively involatile, such as bromine, stream 66 may be subjected to condensation to recover the inorganic component in liquid form. Alternatively, the stream may be further treated by adsorption, absorption, incineration, chemical reaction or any other appropriate recovery or removal technique, or simply discharged.

Figure 7:
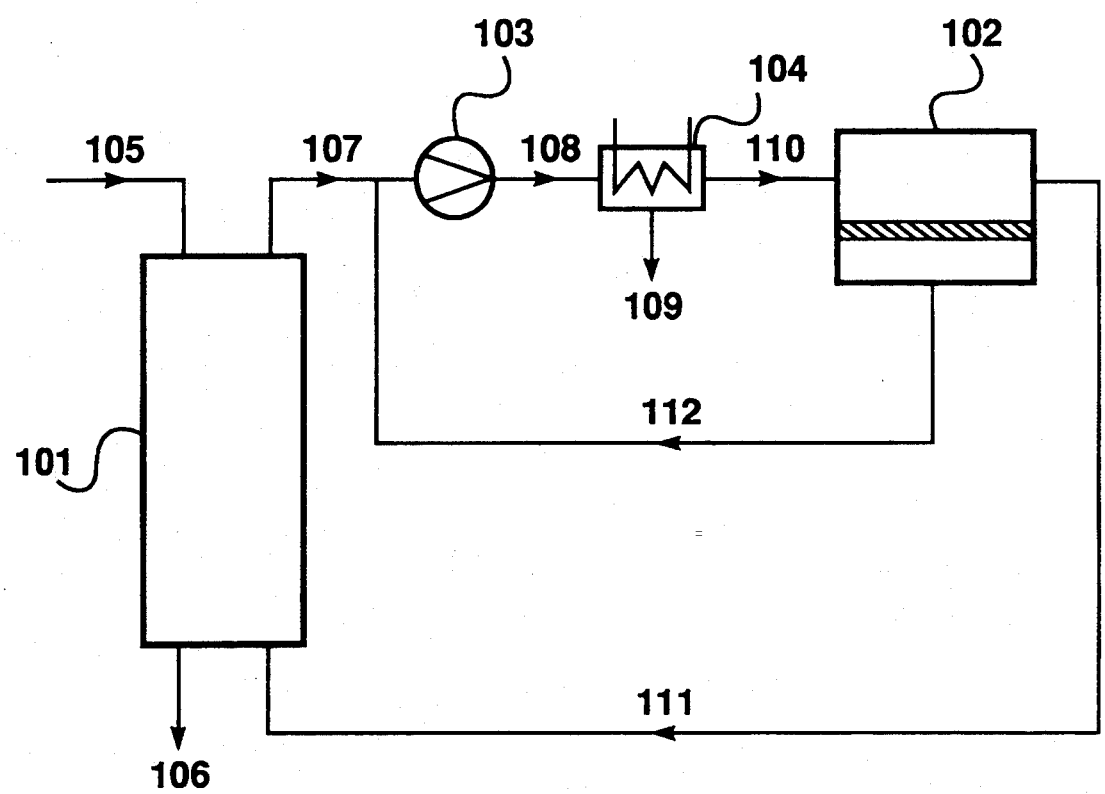
FIG. 7 is a schematic showing an embodiment of the invention using a one-stage membrane unit driven by high pressure on the feed side of the membrane.

An example of a one-stage membrane system operating in high-pressure mode is given in FIG. 7. Referring now to this figure, gas stripper 101 is used to remove an inorganic component from water stream 105. The stripping gas enters the stripper as stream 111 and exits as stream 107, which is ladened with the inorganic component. The treated water stream exits the stripper as stream 106. Gas stream 107 is compressed by compressor 103 and passes as compressed gas stream 108 to condenser 104. An inorganic liquid stream is recovered from the condenser as stream 109. Noncondensed stream 110 from the condenser passes to the membrane separation unit 102 for treatment. The treated gas stream 111, depleted of inorganic compound, is returned to the gas stripper inlet. The inorganic passes preferentially through the membrane and emerges as permeate stream 112, which is returned upstream of the compressor and condenser for inorganic component recovery.

Figure 6:
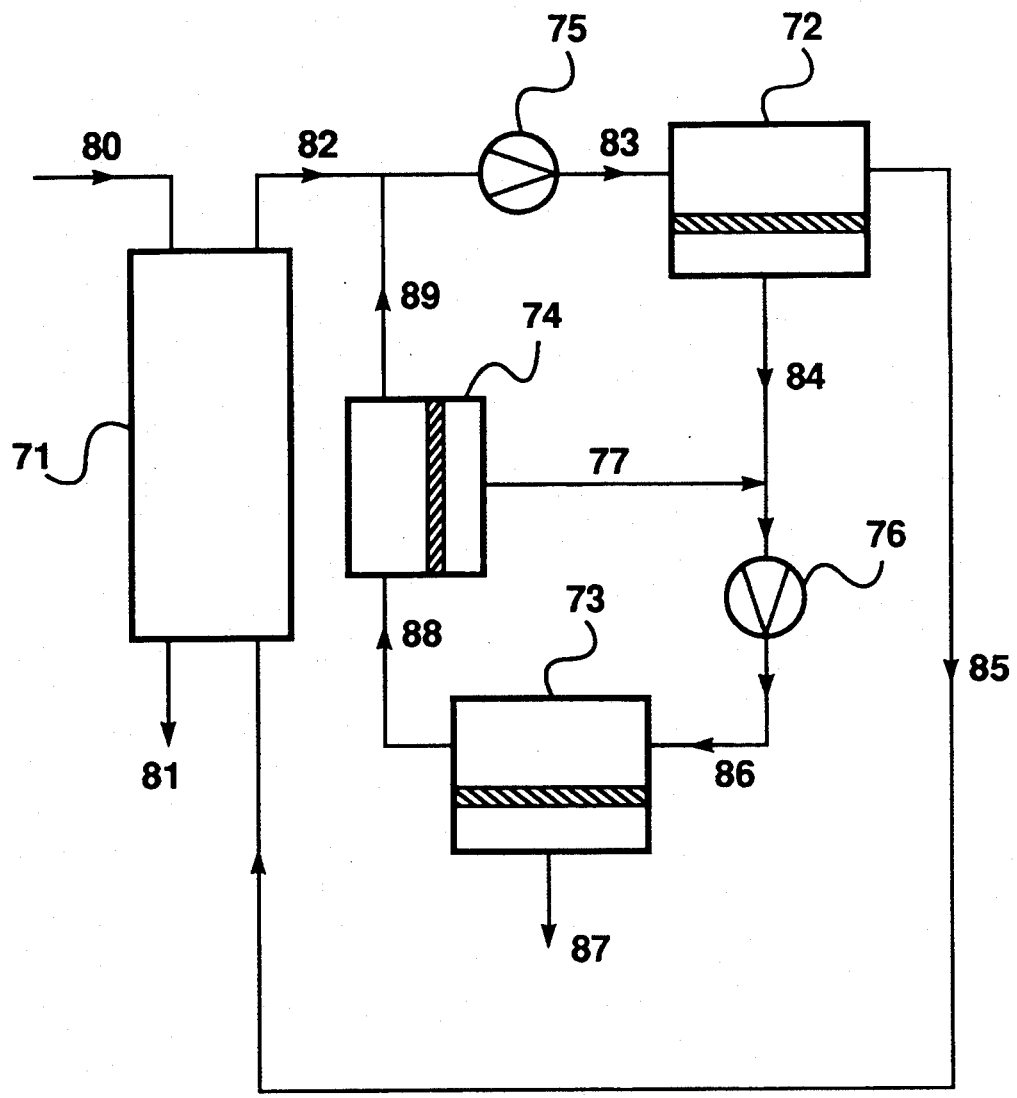
FIG. 6 is a schematic showing an embodiment of the invention using a two-and-a-half-stage membrane unit.

It will be appreciated by those of skill in the art that the arrangement of compressors and vacuum pumps shown in FIGS. 5, 6 and 7 and the routing of the various residue and permeate streams are a few of the many possible configurations for the membrane system. For example, the membrane system may include "one-and-a-half" stage or "two-and-a-half" stage membrane arrangements, as described in U.S. Pat. No. 5,071,451.

In these types of design, an auxiliary membrane module or set of modules is installed across the pump on the downstream side of the membrane stage, thereby improving the performance and operating efficiency of that stage. For example, FIG. 6 shows a two-and-a-half stage arrangement. Gas stripper 71 is used to remove an inorganic component from water stream 80. The stripping gas enters the stripper as stream 85 and exits as stream 82, which is laden with the inorganic. The treated water stream exits the stripper as stream 81. Gas stream 82 is compressed by compressor 75 and passes as compressed gas stream 83 to a first stage membrane separation unit 72. The membrane, which is more permeable to the inorganic component than to the stripping gas, produces a permeate stream 84 enriched in inorganic component and a residue stream 85 depleted in inorganic component compared with stream 82. The residue stream 85 is recycled back to the stripper. The permeate stream, 84, is drawn through the vacuum pump, 76 and emerges as stream, 86, which is passed to the second-stage membrane unit, 73. The permeate from the second membrane stage is withdrawn as product stream, 87. The residue stream, 88, from the second stage is passed through the auxiliary membrane unit, 74, which, like the main membrane separation unit, normally contains membrane selective to the inorganic component to be separated. The auxiliary unit is connected on its permeate side upstream of the driving unit for the main first stage by line or stream 77. The auxiliary module further treats the residue from the second stage to produce a residue stream, 89, the composition of which can be varied by varying the membrane area contained in the auxiliary module. The residue stream 89 from the auxiliary unit is recirculated to the feed side of the first stage membrane unit.

Embodiments such as those shown conceptually in FIG. 1, and specifically in FIGS. 5, 6, and 7, which reuse all or part of the stripping gas, have several advantages. Most gas strippers use air as the stripping gas. However, there are circumstances in which it would be beneficial to use a different stripping gas, for example, nitrogen or methane. Because stripping uses and discharges very large volumes of gas, to use other gases is usually impractical and/or too costly. If the gas can be cleaned and .reused, however, the amount and cost of gas used is limited and it becomes practical to strip with other gases. Inerting is one reason to use other gases than air. In this case, nitrogen, carbon dioxide, argon or any other appropriate inerting gas can be used. Alternatively, a stripping gas appropriate to the ultimate destination of the inorganic component can be used. For example, if the inorganic component is to be incinerated, methane can be used as the stripping gas. The membrane unit is then used to produce a permeate stream enriched in the inorganic component and containing just enough methane to make disposal by incineration practical. The stripping gas can also be chosen to provide improved partitioning between the gas and water phases.

A second advantage is that reuse of the stripping gas can ease the separation burden placed on the membrane unit. If the treated stripping gas is not discharged, a higher residual concentration of inorganic component may be acceptable than would be permitted for release into the atmosphere. In this embodiment, complete reuse of the stripping gas is preferred. In this case, the gas stripper and the membrane separation unit form an essentially closed loop and discharge of inorganic components to the atmosphere is eliminated.

2. Modified gas:water ratio

The invention in this aspect is particularly useful when the stripping gas is not reused. If the gas is to be discharged, it is more difficult to reconcile the contradictory aspects of gas stripping and membrane separation, because the goal is to remove as much of the stripped inorganic component from the stripper exhaust gas stream as possible, while maintaining both an adequate level of water treatment by the stripper and a sufficiently enriched membrane permeate stream for condensation or other recovery or treatment. The invention in this aspect usually achieves a lesser degree of inorganic component removal from the water, but a substantially lower discharge of inorganic component to the atmosphere. This trade-off is accomplished by reducing the gas:water volume ratio used in the stripper. A packed tower operating in countercurrent mode most commonly uses a gas:water volume ratio up to about 500:1, although higher ratios are sometimes used. Towers operating in crossflow mode can run at higher gas:water volume ratios, and ratios up to 2,000:1–3,000:1 are not uncommon. The inorganic component is diluted by a similar factor when it is transferred into the gas. Thus, if the concentration of the inorganic component in the water is, for example, 200 ppm by weight, and the gas:water volume ratio is 200:1, then the inorganic component concentration in the gas will be no greater than 1 ppm by weight, which is low for membrane separation treatment. If the gas:water volume ratio is reduced to 10:1, the concentration of the inorganic component in the gas may be up to 20 ppm by weight, still low, but significantly easier for the membrane system to handle than 1 ppm.

To accommodate the higher-concentration, lower-volume preference of the membrane unit, it is preferred that the gas:water volume ratio in these types of embodiment be no greater than about 50:1, more preferably less than about 20:1 and most preferably less than about 10:1.

The inorganic component removal from the feed water typically achieved by gas stripping ranges from about 40% removal up to about 99.99% removal. Removals of 90% and above are common. At present, most gas strippers are operated with air as the stripping gas. Some air strippers are run at gas flow rates far in excess of those needed for efficient inorganic component removal, the goal being to dilute the effluent gas entering the atmosphere. If this is the case, a reduction of the gas:water volume ratio may be possible without diminishing the inorganic component removal from the water. However, in many cases, reducing the gas flow rate will reduce the efficiency of the stripper, such as for example from 99% to 90% or 80% or below. The membrane system will generally achieve 80%, 90% or more removal of the inorganic component that reaches it in the stripping gas. If a lower water quality can be tolerated, therefore, the quantity of inorganic component released in the form of air pollution may be cut to 20%, 10% or less of its former value. For example, suppose that an existing air stripper operating without any treatment of the stripping gas achieves 95% removal of an inorganic component from water. For every 100 g of the inorganic component, 5 g remain in the water after treatment and 95 g are discharged to the air. If it is acceptable to retain 10 g of inorganic in the water, the gas:water volume ratio can be reduced to the point where only 90% removal of inorganic is achieved. The stripping gas is then passed to a membrane unit which achieves 90% removal of the inorganic reaching it. In this case, the amount of inorganic being discharged to the air is 10% of 90 g, or 9 g. Thus the water quality is diminished, but the amount of inorganic pollution entering the atmosphere is reduced from 95 g to 9 g.

Figure 2:
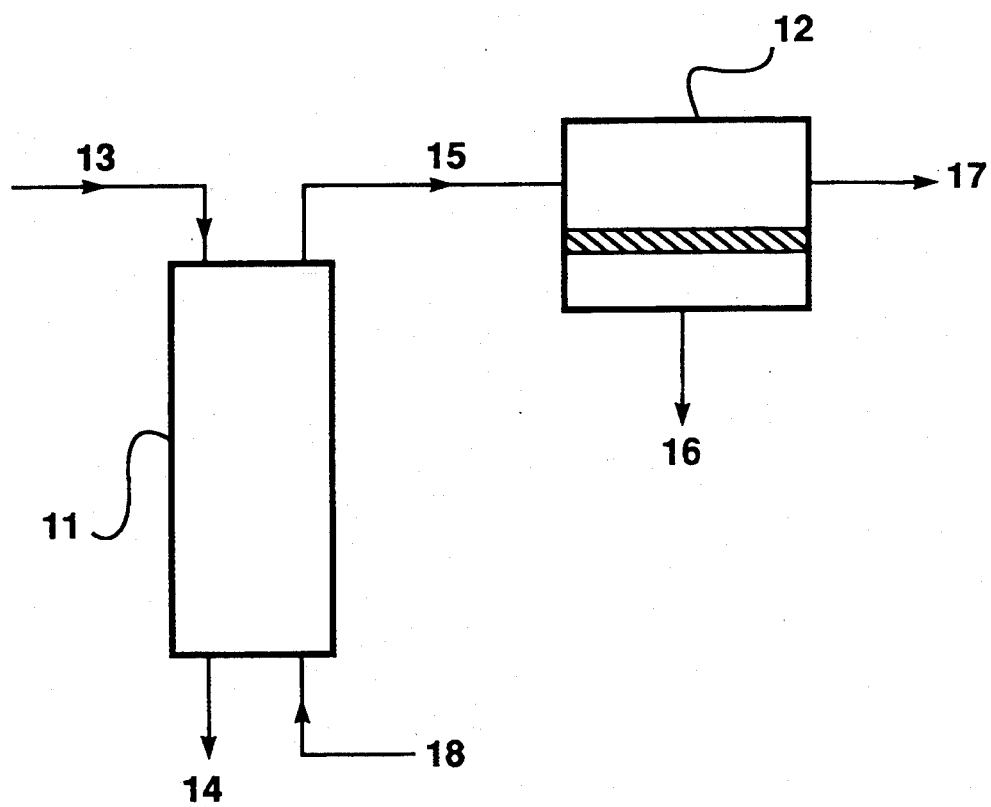
FIG. 2 is a schematic showing an embodiment of the invention in which the treated gas is discharged.

An embodiment of the invention in which a lower gas:water volume ratio is used and in which the stripping gas is discharged is shown in FIG. 2. Referring now to this figure, gas stripper 11 is used to remove inorganic component from water stream 13. The stripping gas enters the stripper as stream 18 and exits as stream 15, which is laden with the inorganic. The treated water stream exits the stripper as stream 14. Gas stream 15 passes to membrane separation unit 12. The inorganic component passes preferentially through the membrane and emerges as permeate stream 16. The treated gas stream, depleted of the inorganic component, exits the membrane separation unit as stream 17 and is discharged.

Figure 8:
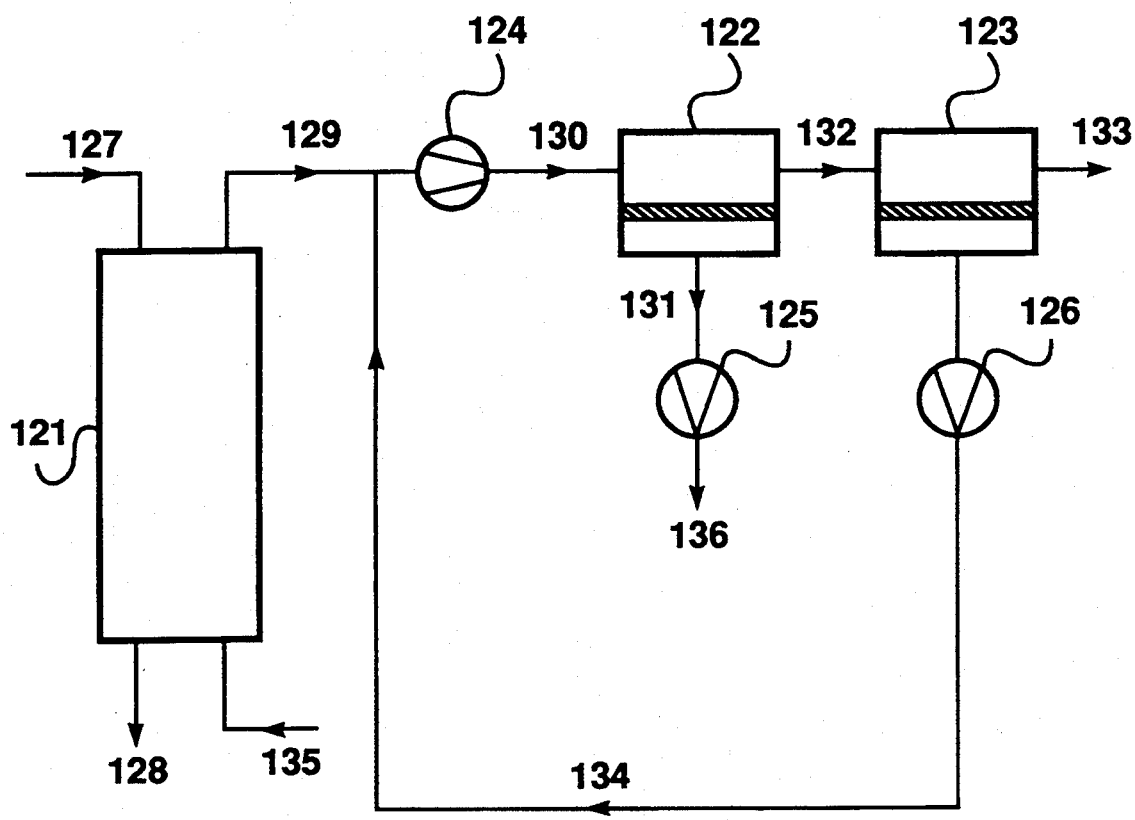
FIG. 8 is a schematic showing an embodiment of the invention using a two-step membrane unit.

As with FIG. 1, FIG. 2 is a schematic showing the process concept. The apparatus used to carry out the process will include other components such as pumps, blowers, etc. As with the embodiments described above, the membrane separation step may be carried out using one membrane stage or an array of membranes, arranged in a variety of configurations where the permeate and/or residue from the first membrane stage is passed to an additional membrane unit or units for further treatment. For example, membrane arrangements similar to those of FIGS. 1, 5, and 6 could be used. If the removal of inorganic component from the feed achieved by one membrane stage is inadequate, the residue stream from the first membrane stage may be passed as the feed stream to a second membrane step to achieve a further purification. For example, if the first stage achieves 90% inorganic removal, then adding a similar second step will achieve a further 90% removal, or 99% removal in total. Such a configuration is shown in FIG. 8. Referring now to this figure, gas stripper 121 is used to remove an inorganic component from water stream 127. The stripping gas enters the stripper as stream 135 and exits as stream 129, which is laden with the inorganic component. The treated water stream exits the stripper as stream 128. Gas stream 129 is compressed by compressor 124 and passes as compressed gas stream 130 to first membrane separation unit 122. A vacuum pump 125 in the permeate line increases the driving force for membrane permeation. The treated gas stream 132, depleted of the inorganic component, but still containing too much inorganic component for discharge or reuse, is passed to a second membrane unit 123 for further treatment. A second vacuum pump 126 in the permeate line of this membrane unit increases the driving force for membrane permeation. The residue stream 133 emerging from this unit is discharged. In both membrane units, the inorganic component passes preferentially through the membrane and emerges as permeate streams 131 and 134. Stream 134 is returned to the feed side of the first membrane unit for further treatment. Stream 131 is drawn through the vacuum pump 125 and emerges as inorganic stream 136.

The representative designs of FIGS. 2 and 8 show discharge of the membrane residue stream. It is, of course, also possible to recirculate the residue stream to the stripper in this type of embodiment.

3. Modified Stripper configuration

In another aspect, the invention maintains the level of water purification that would have been possible by gas stripping alone, yet simultaneously achieves a high level of inorganic component removal from the stripper exhaust gas. Embodiments of this type have to reconcile the preferred operating situations for gas stripping and membrane separation without compromising either water or air quality. This result is achieved by splitting the gas stripping operation into two separate steps. The first step achieves only partial removal of the inorganic component from the water and is designed to facilitate the combination of the gas-stripping operation and the membrane separation operation. The stripping gas from this step passes to the membrane separation step for removal of inorganic component from the gas. The treated water from the first stripping step passes to a second gas stripper. In the second stripper, the inorganic component content of the water is further reduced. Because the water passing to the second stripper contains relatively little inorganic component, the gas from the second stripper may frequently be dischargeable.

Figure 3:
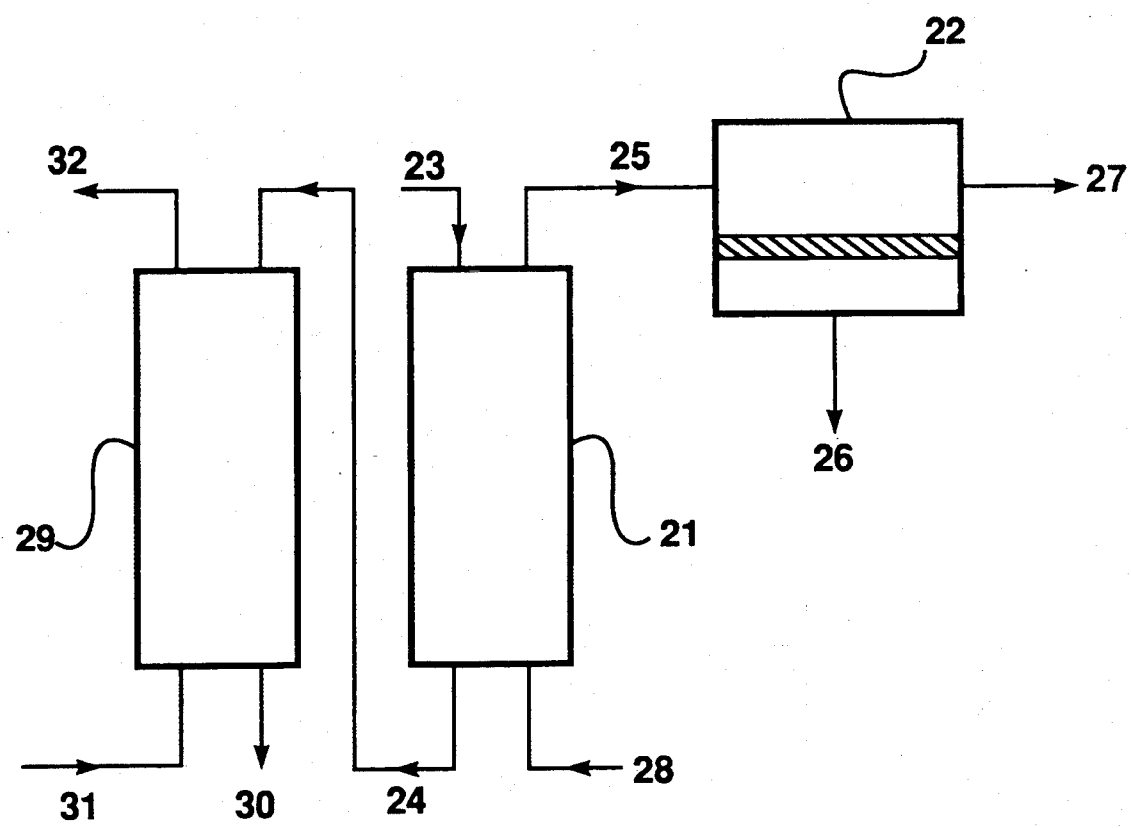
FIG. 3 is a schematic showing an embodiment of the invention using two gas strippers.

An embodiment of the invention in which two gas strippers are used is shown in FIG. 3. Referring now to this figure, first gas stripper 21 is used to partially remove an inorganic component from water stream 23. The stripping gas enters the stripper as stream 28 and exits as stream 25, which is laden with inorganic component. The treated water stream exits the stripper as stream 24. Gas stream 25 passes to membrane separation unit 22. The inorganic component passes preferentially through the membrane and emerges as permeate stream 26. The treated gas stream, depleted of the inorganic component, exits the membrane separation unit as stream 27. Stream 24 passes to the second gas stripper 29. Stripping gas enters the second stripper as stream 31 and exits as stream 32. The treated water stream exits the second stripper as stream 30.

The two strippers may be of the same type or of different types. For example, the first stripper can be a packed tower operating in counterflow mode and the second can be a packed tower operating in crossflow mode. As a second example, the first stripper can be a packed tower and the second can be a tray tower or a low-profile tray stripper. The two strippers may also be of the same type, but operating under different conditions to achieve a different result. For example the first may operate at a relatively low gas:water volume ratio such as less than about 50:1 or lower, such as less than about 20:1 or even 10:1; the second may operate at a higher gas:water volume ratio, such as greater than about 10:1 or greater than about 50:1. It will be apparent to those of skill in the art that many different combinations of stripping system may be employed.

The useful benefits that derive from this type of embodiment can be illustrated by comparing the performance of a conventional stripper with that of the process and apparatus of the invention. For comparison, if a single gas stripper achieving 91% removal of inorganic component from the water is used alone without treatment of the stripping gas, then 91% of the inorganic component originally present in the water will be discharged to the atmosphere. Suppose that two strippers, each operating at a reduced efficiency of only 70%, are used instead. If the first stripper achieves 70% inorganic component removal from the water, the water passing to the second stripper contains 30% of the originally present inorganic component. If this stripper also achieves 70% removal of the inorganic component that reaches it, the net result will be the removal of 91% of the inorganic component originally present in the water, the same result as was achieved with the single stripper. If the membrane separation operation removes 90% of the inorganic component that reaches it, then it will remove 63% of the inorganic component originally present in the water and will discharge 7% to the atmosphere. The gas from the second stripper contains 21% of the inorganic component originally present in the water. Thus 28% of the inorganic component that was originally in the water will be discharged, compared with 91% for the single stripper operating alone. If the strippers both achieve 80% removal of inorganic component from water and the membrane separation operation removes 90% of the inorganic component reaching it, the net removal from the water is 96% and the amount of inorganic discharged to the atmosphere is 24% of that originally present in the water.

Alternatively, two strippers with unlike performance may be used. For example the gas:water volume ratio of the first may be reduced to facilitate the membrane separation step and a high gas:water volume ratio may be used in the second stripper to achieve maximum removal of the remaining inorganic component from the water. If the first stripper achieves only 70% inorganic component removal from the water, the water passing to the second stripper contains 30% of the originally present inorganic component. If this stripper achieves 90% removal of the inorganic component that reaches it, the net result will be the removal of 97% of the inorganic component originally present in the water. If the membrane separation operation removes 90% of the inorganic component that reaches it, then 7% of the inorganic component originally present in the water will be discharged to the atmosphere from the first stripper. The gas from the second stripper contains 28.5% of the inorganic component originally present in the water. Thus 35.5% of the inorganic component that was originally in the water will be discharged to the atmosphere, compared with 97% if a single stripper was used without treatment of the exhaust gas. If the first stripper achieves 85% removal of inorganic component from water, the second stripper 95% and the membrane separation operation 90%, the net removal from the water will be 99.25% and the amount of inorganic discharged to the atmosphere would be 23% of that originally present in the water, compared with 99.25% if a single stripper was used without treatment of the exhaust gas.

As with the other embodiments, the membrane separation step may be carded out using one membrane stage or an array of membranes. For example, if 90% removal of the inorganic component present in the feed to the membrane unit is inadequate, the residue stream from the first membrane stage may be passed as the feed stream to a second step to achieve a further 90% removal, or 99% removal in total. The permeate stream may also be passed to second or third membrane stages as necessary.

Alternatively, the first stripping step may not be followed by a second stripping step, but by another separation. For example, in the case of nitrogen with trace amounts of hydrogen sulfide, a chemical destruction process could be used, or for nitrogen with hydrogen cyanide, a bio-treatment technique or carbon adsorption could be used.

It may be seen, therefore, that there is a great deal of flexibility for tailoring the amounts of inorganic remaining in the water and discharged to the atmosphere to meet specific requirements. FIG. 3 shows discharge of the treated residue stream from the membrane unit. It is, of course, possible and often desirable to recirculate the residue gas stream from the membrane unit for reuse in the gas-stripping step.

It is also possible to replace the second gas stripper by some other treatment process. For example, the concentration of inorganic in the treated water exiting the first stripper will normally be reduced to a small percentage of its original value. This may bring the stream into a concentration range where treatment by adsorption, absorption, catalytic incineration, chemical destruction, ozonation, biological treatment, etc. may be appropriate and may have technical or financial advantages over using a second stripper.

4. Stripper run at reduced pressure

In another aspect, the invention involves adapting the gas-stripping operation to facilitate combination with membrane separation by operating the gas-stripping step under reduced pressure compared with the membrane separation step. Suppose, for example, the stripper is operated at a gas pressure of 0.5 atm by connecting a vacuum pump in the outlet line from the gas stripper between the gas stripper and the membrane unit and further suppose that the downstream side of the vacuum pump is at 1 atm pressure. Then the pressure on the feed side of the membrane is twice that within the stripper, the volume flow of gas passing through the membrane unit is half that passing through the gas stripper and the volume concentration of inorganic component entering the membrane unit will be twice the equilibrium concentration in the gas stripper. In this way the gas volume is reduced and its concentration increased before it reaches the membrane unit for treatment. The same concentrating effect unit may be achieved by using a compressor between the stripper and the membrane unit.

Figure 4:
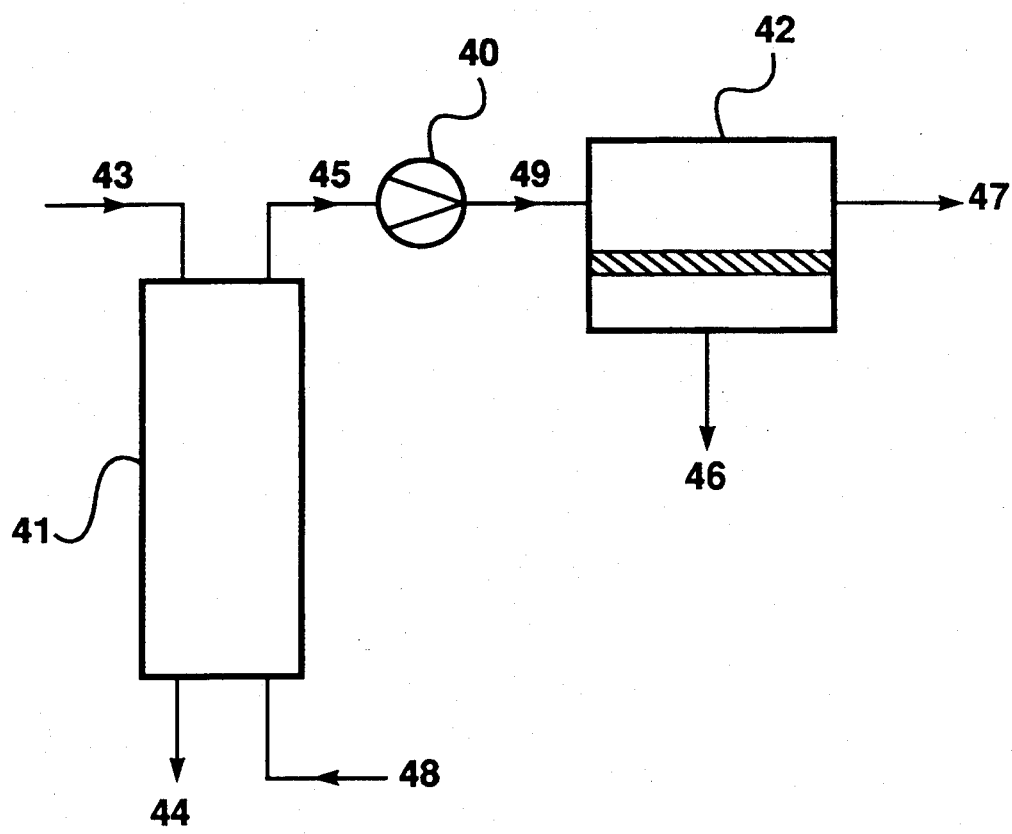
FIG. 4 is a schematic showing an embodiment of the invention in which the stripping gas is at subatmospheric pressure.

An embodiment of the invention in which the gas stripper is operated at subatmospheric pressure is shown in FIG. 4. Referring now to this figure, gas stripper 41 is used to remove an inorganic component from water stream 43. The stripping gas enters the stripper as stream 48 and is drawn through the stripper by vacuum pump 40, which draws a partial vacuum on the stripper. The stripping gas exits the stripper as stream 45, laden with inorganic component, and passes through vacuum pump 40 emerging as feed stream 49 to the membrane unit 42. Stream 49 is, therefore, at higher pressure than stream 45. The inorganic component passes preferentially through the membrane and emerges as permeate stream 46. The treated gas stream, depleted of the inorganic component, exits the membrane separation unit as stream 47. The treated water stream exits the stripper as stream 44.

As with FIGS. 1, 2 and 3, FIG. 4 is a schematic showing the process concept. The apparatus used to carry out the process will include other components such as pumps, blowers, etc. and the membrane unit can contain one membrane stage or an array of multiple stages and/or steps.

If the membrane system is driven by lowering the pressure on the permeate side, the same vacuum pump may conveniently be used both to lower the pressure of the stripping operation and to provide a driving force for membrane permeation. Another advantage of running the gas stripper at subatmospheric, rather than atmospheric, pressure is that enhanced partitioning of the inorganic component from the water into the gas is achieved.

In all embodiments, transfer of inorganic component from the liquid phase into the gas phase in the stripper is enhanced by heating the water stream. Direct heating may be used, but it is preferable wherever possible to design the combined gas stripping/membrane separation apparatus to take advantage of heat exchange possibilities. As nonlimiting examples, the incoming feed water may be warmed by using it to cool any vacuum pumps or compressors used in the apparatus. If chilling is used to condense some of the inorganic components prior to entry into the membrane unit, the gas passing through the membrane unit will be cool. This gas can be used to cool any vacuum pumps or compressors in the apparatus and then returned warm to the gas stripper. Depending on the specific system design and components, many such heat-integration arrangements will be apparent to those of skill in the art.

Embodiments of the invention in which steam forms all or at least part of the stripping gas are contemplated. The steam carries heat into the stripping tower and facilitates inorganic component removal by heating the fluid to be stripped. The steam also provides a volume of gas into which the dissolved inorganic components can partition. Some steam condenses as it passes through the stripper, resulting in concentration of the inorganics in the remaining noncondensed strip gas. The steam in the exit stripping gas can be condensed before the exhaust gas is passed to the membrane unit for treatment. This has a similar effect to drawing a partial vacuum on the stripper, in that the volume of gas passing to the membrane unit is reduced compared with the volume of strip gas and the concentration of inorganic component in the gas is, therefore, increased.

The invention is now further illustrated by the following examples, which are intended to be illustrative of the invention, but are not intended to limit the scope or underlying principles of the invention in any way.

EXAMPLES

Examples 1–3 are drawn from earlier U.S. patents and show representative membrane types useful in carrying out the invention.

Example 1

Example 1 shows the performance of polyamide-polyether membranes exposed to pure gases. These examples are from earlier work at Membrane Technology and Research, as already reported in U.S. Pat. No. 4,963,165. A multilayer composite membrane was prepared by coating a polysulfone support membrane first with a thin high-flux, sealing layer, then with a 1 wt % solution of Pebax grade 4011 in i-butanol. The membrane was tested with pure gases at a temperature of 20° C. and a feed pressure of 50 psig. The results are shown in Table 1.

TABLE 1

Permeation Properties of Pebax 4011 Composite Membranes Tested with Pure Gases

| Feed Pressure (Psig) | Pressure Normalized Flux × $10^6$ [$cm^3(STP)/(cm^2 \cdot s \cdot cmHg)$] | | Membrane Selectivity |
|---|---|---|---|
| | $H_2S$ | $CH_4$ | $\alpha(H_2S/CH_4)$ |
| 50 | 1,750 | 9.19 | 190 |
| | $SO_2$ | $N_2$ | $\alpha(SO_2/N_2)$ |
| 50 | 3,500 | 5 | 700 |

Example 2

A glassy polysulfone membrane as described in U.S. Pat. No. 4,230,463 would be useful in the invention. Representative performance data are reproduced from U.S. Pat. No. 4,230,463 below.

TABLE 2

Permeation Properties of Polysulfone Coated with Silicone Rubber

| Pressure Normalized Flux × $10^6$ [$cm^3(STP)/cm^2 \cdot s \cdot cmHg$] | | Membrane Selectivity |
|---|---|---|
| $H_2S$ | $CH_4$ | $\alpha(H_2S/CH_4)$ |
| 31 | 2.3 | 13.48 |
| $NH_3$ | $N_2$ | $\alpha(NH_3/N_2)$ |
| 210 | 1.4 | 150 |

Example 3

A composite silicone rubber membrane as described in U.S. Pat. No. 4,608,060 would also be useful in the invention. Representative performance data are reproduced from U.S. Pat. No. 4,608,060 in Table 3.

TABLE 3

Permeation Properties of Composite Silicone Rubber Membrane

| Pressure Normalized Flux × $10^6$ [$cm^3(STP)/cm^2 \cdot s \cdot cmHg$] | | Membrane Selectivity |
|---|---|---|
| $SO_2$ | $N_2$ | $\alpha(SO_2/N_2)$ |
| 450 | 5.29 | 85.1 |

TABLE 3-continued

| Permeation Properties of Composite Silicone Rubber Membrane | | |
|---|---|---|
| Pressure Normalized Flux × $10^6$ [$cm^3$(STP)/$cm^2 \cdot s \cdot cmHg$] | | Membrane Selectivity |
| $H_2S$ | $CH_4$ | $\alpha(H_2S/CH_4)$ |
| 140 | 14.1 | 9.91 |
| $NH_3$ | $N_2$ | $\alpha(NH_3/N_2)$ |
| 190 | 5.46 | 34.8 |

Example 4

Numerical data were generated using a computer program designed to model the performance of a membrane separation system. It was assumed that the membrane system contained a polyamide-polyether membrane as in Example 1, and that the apparatus configuration was as shown in FIG. 1 with minor variations. The entire residual stream 7 of the membrane separation unit 2 is recycled to the stripper 1, eliminating the discharge stream 9. Furthermore, a compressor and a vacuum pump were also used. The compressor (150 psia) was placed on the gas stream 5 entering the membrane separation unit 2 and the vacuum pump (2 psia) was placed on the gas stream 6 exiting the membrane separation unit 2. Nitrogen was used as the stripping gas. The results are listed in Table 4.

TABLE 4

| Numerical Data of Combined Stripper/Pebax Membrane Separation System Operating with Hydrogen Sulfide and Sulfur Dioxide as Model Contaminants. | | | | | | |
|---|---|---|---|---|---|---|
| Model Contaminant | $N_2$ flow rate (scfm) | Water flow rate (L/min) | Water Inlet Conc. (ppmw) | Removal by Stripper (%) | $N_2$ Outlet Conc. (%) | Removal by Membrane (%) |
| $H_2S$ | 193 | 1,000 | 1,000 | 90 | 14.1 | 91.4 |
| $SO_2$ | 2,390 | 1,000 | 1,000 | 90 | 0.50 | 90.3 |

Example 5

Numerical data were generated, as in Example 4, for the removal of bromine gas from a water solution, using a silicone rubber membrane in the apparatus shown by FIG. 7. Nitrogen was used as the stripping gas. The results are listed in Table 5.

TABLE 5

| Numerical Data of Combined Stripper/Silicone Rubber Membrane Separation System Operating with Bromine Gas as a Model Contaminant. | | | | | |
|---|---|---|---|---|---|
| $N_2$ flow rate (scfm) | Water flow rate (L/min) | Water Inlet Conc. (ppmw) | Removal by Stripper (%) | $N_2$ Outlet Conc. (%) | Removal by Membrane (%) |
| 1,645 | 1,000 | 2,000 | 99 | 0.60 | 99.5 |

Example 6

Numerical data were generated, as in Example 4, for the removal of hydrogen sulfide from a water solution, using a polyamide-polyether membrane as in Example 1, and an apparatus configuration as shown in FIG. 8 with minor variations. The residue stream 133 of the second membrane separation unit 123 is recycled to the stripper 121. Nitrogen was used as the stripping gas. The results are listed in Table 6.

TABLE 6

| Numerical Data of Combined Stripper/Pebax Membrane Separation System Operating with Hydrogen Sulfide as a Model Contaminant. | | | | | |
|---|---|---|---|---|---|
| $N_2$ flow rate (scfm) | Water flow rate (L/min) | Water Inlet Conc. (ppmw) | Removal by Stripper (%) | $N_2$ Outlet Conc. (%) | Removal by Membrane (%) |
| 168 | 1,000 | 100 | 95 | 1.4 | 95.1 |

Example 7

Numerical data were generated, as in Example 4, for the removal of hydrogen sulfide from a water solution, using a polyamide-polyether membrane as in Example 1, and an apparatus configuration as shown by FIG. 6 with minor variations. A vacuum pump (2 psia) was installed to recover the permeate stream 87 of the second membrane separation unit 73. Nitrogen was used as the stripping gas. The results are listed in Table 7.

TABLE 7

| Numerical Data of Combined Stripper/Pebax Membrane Separation System Operating with Hydrogen Sulfide as a Model Contaminant. | | | | | |
|---|---|---|---|---|---|
| $N_2$ flow rate (scfm) | Water flow rate (L/min) | Water Inlet Conc. (ppmw) | Removal by Stripper (%) | $N_2$ Outlet Conc. (%) | Removal by Membrane (%) |
| 165 | 1,000 | 100 | 98 | 1.4 | 93.1 |

We claim:

1. A process for removing an inorganic component from water, comprising:
   (a) introducing a flow of water to a gas-stripping step adapted to contact gas and water in a gas:water volume ratio, thereby causing stripping of said inorganic component from said water by said gas and producing an inorganic-depleted water stream;
   (b) passing said gas to a membrane separation step, comprising:
      (i) providing a membrane having a feed side and a permeate side;
      (ii) contacting said feed side with said gas;
      (iii) withdrawing from said membrane a permeate gas stream enriched in said inorganic component compared with said gas;
      (iv) withdrawing from said membrane a residue gas stream depleted in said inorganic component compared with said gas;
   (c) reusing at least a part of said residue gas stream as stripping gas in said gas-stripping step.

2. The process of claim 1, wherein said membrane comprises a composite membrane comprising a microporous support layer and a permselective coating layer.

3. The process of claim 1, wherein said membrane comprises an asymmetric membrane.

4. The process of claim 1, wherein said membrane comprises a rubbery polymer.

5. The process of claim 1, wherein said membrane comprises a glassy polymer.

6. The process of claim 1, wherein said inorganic component is chosen from the group consisting of hydrogen sulfide, bromine, hydrogen cyanide, sulfur dioxide, oxygen, carbon dioxide, ammonia and hydrazine.

7. The process of claim 1, wherein said membrane separation step includes providing a partial vacuum on the permeate side of the membrane.

8. The process of claim 1, wherein said membrane separation step includes compressing said gas above atmospheric pressure prior to bringing it into contact with said feed side.

9. The process of claim 1, wherein said membrane separation step is accomplished using one membrane stage.

10. The process of claim 1, wherein said membrane separation step is accomplished using multiple membrane stages.

11. The process of claim 1, further comprising:
(d) subjecting said enriched gas stream to a recovery process to recover said inorganic component.

12. The process of claim 1, wherein said gas is chosen from the group consisting of air, nitrogen, steam, and methane.

13. The process of claim 1, wherein said inorganic component is present in said water at a concentration less than 100 ppmw.

14. The process of claim 1, wherein said inorganic component is present in said water at a concentration more than 100 ppmw.

15. The process of claim 1, wherein said process achieves at least 60% inorganic component removal from said water.

16. The process of claim 1, wherein said process achieves at least 90% inorganic component removal from said water.

17. The process of claim 1, wherein said membrane separation step achieves at least 90% inorganic component removal from said gas.

18. The process of claim 1, wherein the gas:water volume ratio in said stripping step is less than about 50:1.

19. The process of claim 1, wherein the gas:water volume ratio in said stripping step is less than about 10:1.

20. The process of claim 1, further comprising heating said water prior to said gas-stripping step.

21. A process for removing an inorganic component from water, comprising:
(a) introducing a flow of water to a first gas-stripping step adapted to contact gas and water in a first gas:water volume ratio, thereby causing stripping of said inorganic component from said water by said gas and producing a partially inorganic-depleted water stream;
(b) passing said gas to a membrane separation step, comprising:
(i) providing a membrane having a feed side and a permeate side;
(ii) contacting said feed side with said gas;
(iii) withdrawing from said membrane a permeate gas stream enriched in said inorganic component compared with said gas;
(iv) withdrawing from said membrane a residue gas stream depleted in said inorganic component compared with said gas;
(c) passing said partially inorganic-depleted water stream to a second gas-stripping step adapted to contact gas and water in a second gas:water volume ratio.

22. The process of claim 21, wherein said first gas:water volume ratio in said first stripping step is less than about 50:1.

23. The process of claim 21, wherein said first gas:water volume ratio in said first stripping step is less than about 10:1.

24. The process of claim 21, wherein said second gas:water volume ratio in said second stripping step is greater than about 10:1.

25. The process of claim 21, wherein said second gas:water volume ratio in said second stripping step is greater than about 50:1.

26. The process of claim 21, wherein said first and second gas:water volume ratios in said first and second gas stripping steps are substantially different.

27. A process for removing an inorganic component from water, comprising:
(a) introducing a flow of water to a first gas-stripping step adapted to contact gas and water, thereby causing stripping of said inorganic component from said water by said gas and producing a partially inorganic-depleted water stream;
(b) passing said gas to a membrane separation step, comprising:
(i) providing a membrane having a feed side and a permeate side;
(ii) contacting said feed side with said gas;
(iii) withdrawing from said membrane a permeate gas stream enriched in said inorganic component compared with said gas;
(iv) withdrawing from said membrane a residue gas stream depleted in said inorganic component compared with said gas;
(c) passing said partially inorganic-depleted water stream to a second treatment step that is not a gas-stripping step.

28. The process of claim 27, wherein said second treatment step is selected from the group consisting of adsorption, absorption, catalytic incineration, chemical destruction, ozonation and biological treatment.

29. A process for removing an inorganic component from water, comprising:
(a) introducing a flow of water to a gas-stripping step adapted to contact gas and water in a gas:water volume ratio less than about 50:1, thereby causing stripping of said inorganic component from said water by said gas and producing an inorganic-depleted water stream;
(b) passing said gas to a membrane separation step, comprising:
(i) providing a membrane having a feed side and a permeate side;
(ii) contacting said feed side with said gas;
(iii) withdrawing from said membrane a permeate gas stream enriched in said inorganic component compared with said gas;
(iv) withdrawing from said membrane a residue gas steam substantially depleted in said inorganic component compared with said gas.

30. The process of claim 29, wherein said gas:water volume ratio is less than about 20:1.

31. The process of claim 29, wherein said gas:water volume ratio is less than about 10:1.

32. A process for removing an inorganic component from water, comprising:
(a) introducing a flow of water and a flow of gas, said gas being at subatmospheric pressure, to a gas-stripping step adapted to contact said gas and water, thereby causing stripping of said inorganic component from said water by said gas and producing an inorganic-depleted water stream;
(b) passing said gas to a membrane separation step, comprising:

(i) providing a membrane having a feed side and a permeate side;
(ii) contacting said feed side with said gas;
(iii) withdrawing from said membrane a permeate gas stream enriched in said inorganic component compared with said gas;
(iv) withdrawing from said membrane a residue gas stream depleted in said inorganic component compared with said gas.

33. The process of claim 32, wherein said subatmospheric pressure is less than about 0.5 atm.

34. The process of claim 32, wherein said subatmospheric pressure is achieved by passing said gas through a vacuum pump between said gas-stripping step and said membrane separation step.

35. The process of claim 34, wherein said membrane separation step is driven by connecting said permeate side to a low pressure side of said vacuum pump.

36. A process for removing an inorganic component from water, comprising the steps of:
   (a) introducing a flow of water to a gas-stripping step adapted to contact gas and water, thereby causing stripping of said inorganic component from said water, by said gas and producing an inorganic-depleted water stream;
   (b) passing said gas to a membrane separation step, comprising;
      (i) providing a first driving means for a first membrane having a first feed side and a first permeate side;
      (ii) contacting said first feed side with said gas;
      (iii) withdrawing from said first permeate side a first permeate stream enriched in said inorganic component compared with said gas;
      (iv) withdrawing from said first feed side a first residue stream depleted in said inorganic component compared with said gas;
      (v) passing said first permeate stream through a second driving means to a second membrane having a second feed side and a second permeate side;
      (vi) recovering from said second permeate side a second permeate stream enriched in said inorganic component compared with said first permeate stream;
      (vii) withdrawing from said second feed side a second residue stream depleted in said inorganic component compared with said first permeate stream;
      (viii) passing said second residue stream across a third membrane having a third feed side and a third permeate side;
      (ix) withdrawing from said third permeate side a third permeate stream enriched in said inorganic component compared with said second permeate stream;
      (x) withdrawing from said third feed side a third residue stream depleted in said inorganic component compared with said second permeate stream;
      (xi) passing said third permeate stream to an inlet side of said second driving means;
      (xii) passing said third residue stream to an inlet side of said first driving means;
   (c) reusing said first residue stream as stripping gas in said gas-stripping step.

37. A process for removing a nonvolatile inorganic component from water, comprising the steps of:
   (a) passing said water containing said nonvolatile inorganic component to a treatment step, thereby converting said nonvolatile inorganic component into a volatile inorganic component;
   (b) introducing said water to a gas-stripping step adapted to contact gas and water, thereby causing stripping of said volatile inorganic component from said water by said gas and producing a volatile-inorganic-depleted water stream;
   (c) passing said gas to a membrane separation step, comprising:
      (i) providing a membrane having a feed side and a permeate side;
      (ii) contacting said feed side with said gas;
      (iii) withdrawing from said membrane a permeate gas stream enriched in said volatile inorganic component compared with said gas;
      (iv) withdrawing from said membrane a residue gas stream depleted in said volatile inorganic component compared with said gas;
   (d) reusing at least a part of said residue gas stream as stripping gas in said gas-stripping step.

38. The process of claim 37, wherein said treatment step comprises acidification.

39. The process of claim 37, wherein said treatment step comprises chlorination.

40. An apparatus, comprising:
   (a) a gas-stripping unit having a water inlet, a water outlet, a gas inlet and a gas outlet;
   (b) a membrane gas separation unit containing a membrane having a feed side and a permeate side, said membrane gas separation unit being connected in a gas-transferring loop with said gas-stripping unit such that gas can flow from said gas outlet to said feed side of said membrane gas separation unit and can flow from said feed side after treatment to said gas inlet;
   (c) means for circulating gas in said gas-transferring loop;
   (d) means for providing a driving force for gas separation in said membrane gas separation unit.

41. The apparatus of claim 40, wherein said means for circulating gas comprises a blower.

42. The apparatus of claim 40, wherein said means for providing a driving force comprises a compressor connected between said gas outlet and said feed side.

43. The apparatus of claim 42, further comprising a condenser connected between said compressor and said feed side.

44. The apparatus of claim 43, wherein said means for providing a driving force comprises a vacuum pump connected between said permeate side and said condenser.

45. The apparatus of claim 40, wherein said membrane is a composite membrane comprising a microporous support layer and a thin permselective coating layer.

46. The apparatus of claim 40, wherein said membrane comprises a rubbery polymer.

47. The apparatus of claim 40, wherein said membrane is packaged in a spiral-wound membrane module.

48. The apparatus of claim 40, further comprising a second gas-stripping unit having a second water inlet, a second water outlet, a second gas inlet and a second gas outlet, said second water inlet being connected to said water outlet.

49. The apparatus of claim 40, wherein said membrane gas separation unit comprises multiple membrane separation stages.

50. The apparatus of claim 40, further comprising a heater connected upstream of said water inlet.

51. The apparatus of claim 40, further comprising a heat exchanger having a gas side and a water side and positioned on said water side upstream of said water inlet, and on said gas side downstream of at least one of said means for circulating gas in said gas-transferring loop and means for providing a driving force for gas separation in said membrane gas separation unit.

52. The apparatus of claim 40, wherein said means for circulating gas comprises a vacuum pump connected between said gas outlet and said feed side.

53. The apparatus of claim 52, further comprising a condenser connected between said vacuum pump and said feed side.

54. The apparatus of claim 40, wherein said means for providing a driving force comprises connecting said permeate side to a low-pressure side of said vacuum pump.

55. The apparatus of claim 40, further comprising a filter connected upstream of said water inlet.

* * * * *